United States Patent Office 3,438,947
Patented Apr. 15, 1969

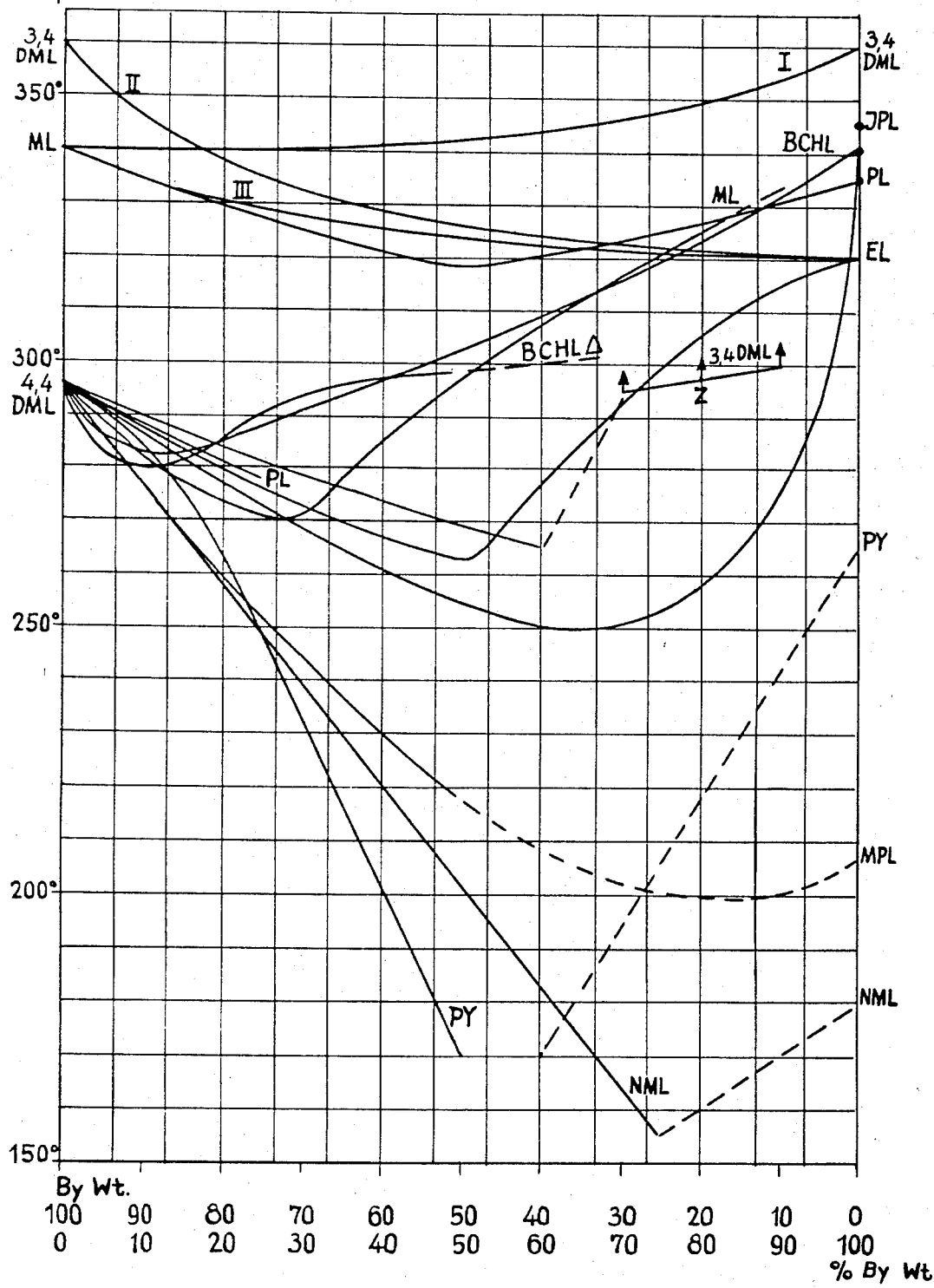

3,438,947
COPOLY-β-AMIDES AND PROCESS FOR
THEIR MANUFACTURE
Walter Rupp, Niederhofheim, Taunus, Germany, assignor to Farbwerke Hoechst Aktiengesellschaft vormals Meister Lucius & Bruning, Frankfurt am Main, Germany, a corporation of Germany
Filed Apr. 19, 1965, Ser. No. 449,094
Claims priority, application Germany, Apr. 18, 1964,
F 42,652
Int. Cl. C08g 20/10; D01f 7/04
U.S. Cl. 260—78                                3 Claims

ABSTRACT OF THE DISCLOSURE

A process has been provided for preparation of copolymer β-amides by polymerizing β-lactams especially those monosubstituted in the 4 position. A representative copolymer has as its monomer precursors 4-monomethyl-azetidin-2-one, 3,4-dimethyl-azetidin-2-one and 4 - monoethyl-azetidin-2-one. The copolymer is useful as a fiber.

---

The present invention relates to copoly-β-amides and to a process for their manufacture.

In general, the characteristic of a copolymerization consists in that the second order transition temperature is shifted and the melting point of the polymer descends, the softness, the flexibility and the solubility in the common organic solvents improve and that the crystalline portion diminishes owing to the disorder of the symmetry and the regular structure of the chain molecule.

The influence of the composition of copolyamides on the melting point, the second order transition temperature and the solubility has repeatedly been described (cf. W. E. Catlin, E. P. Czerwin and R. H. Wiley, Journ. Polymer Sci., volume 2 (1947), page 412; P. J. Flory, Journ. Chem. Phys. volume 17 (1949), page 223; R. D. Evans, H. R. Mighton and P. J. Flory, Journ. Amer. Chem. Soc., volume 72 (1950), page 2018; O. B. Edgar and R. Hill, Journ. Polymer Sci., volume 8 (1952), page 1; and German Patent 1,141,452).

Fiber-forming polymers of industrial importance are usually products having a very limited solubility in the customary solvents and a relatively high melting point. In most cases they are crystalline. A high crystallinity appears to guarantee a substantial molecular orientation during drawing and thus largely influences the properties of the fibers. Since copolymers have lower melting points, a lower crystallinity and a higher solubility, it could be expected that fibers made from copolymers exhibit poorer qualities than fibers of the corresponding homopolymers. This assumption finds its support in the melting and dissolution properties of several series of copolymers of 4,4-dimethyl-azetidin-2-one with 4 - neopentyl-4-methyl-azetidin-2-one, 4 - methyl - 4 - n - propyl - azetidin - 2 - one, 4 - ethyl - azetidin - 2 - one, 4 - methyl - azetidin - 2 - one, 3,4 - dimethyl - azetidin - 2 - one, 4 - isopropyl - azetidin-2 - one and pyrrolidone - 2 as well as 4 - phenyl - azetidin-2-one with 4 - methyl - azetidin - 2 - one.

It has now been found that copoly-β-amides can advantageously be prepared from β-lactams by polymerizing mixtures of at least two of the following compounds: 3,4-dimethyl - azetidin - 2 - one, 4 - monomethyl - azetidin-2-one and 4 - monoethyl - azetidin - 2 - one. The copolymers thus obtained are highly crystalline, even if both components are contained therein in comparable amounts. The curves of the melting points do not show any minima, that is to say a depression of the melting point does not occur and the crystal lattice is not interrupted in a series of copolymers. The products obtained have melting points which are extremely high for polyamides. When they are slowly heated, the products decompose before they melt. The solubility in organic solvents does not improve in a series of copolymers. The copolymers are very resistant to hydrolysis in acids so that they can be spun from acids. The fibers made from the said copolymers have properties which are in many cases superior to the properties of fibers of the homopolymers. When all three of the cited monomers are copolymerized together the products obtained can be spun to fibers having likewise good properties. The mixing ratio of the compounds can be chosen as desired. It depends on the desired properties of the polyamides. Fibers having especially good properties can be spun from copolymers consisting of 80–50% of 4-monomethyl-azetidin-2-one,
15–30% of 3,4-dimethyl-azetidin-2-one, and
5–20% of 4-ethyl-azetidin-2-one.

The high crystallinity of the copolymers could not be expected. In most cases such polymers are crystalline as have chemically and geometrically a regular structure. With copolymers the crystallinity mostly decreases with an increasing amount of a second component; the crystal structure is interrupted and changes within a series.

The copolymers according to the invention obviously have a mixed crystal structure which is not interrupted in a series. This could not be expected, above all with copolymers containing 3,4 - dimethyl - azetidin - 2 - one as one component, since the monomer itself is a mixture of two stereo-isomeric forms, which, on their part, are present as racemates of the d- and l-configuration.

In view of the foregoing, it was also surprising that the curves of the melting points do not show any minimum, that the solubility in organic solvents do not improve and above all, that the textile properties of fibers made from the copolymers according to the invention are better than those of the corresponding homopolymers and of fibers of other poly-β-lactams, for example of poly-4,4 - dimethyl-azetidin-2-one. The fibers of the copolymers according to the invention have a high tensile strength in the wet and in the dry state, they are soft and flexible, transparent and lustrous. Especially advantageous are their high decomposition points so that melting of the fibers on ironing is impossible. Under the action of heat the fibers behave like wool.

The copolymers are prepared according to known processes, for example by anionic or condensing polymerization in solvents or without solvents or in dispersion.

The following examples serve to illustrate the invention but they are not intended to limit it thereto.

EXAMPLE 1

In the annexed diagram there is illustrated the dependence of the melting properties of various copolyamides on their composition. The curves of the three series of copolymers I, II and III differ from all other curves in that they do not show a minimum, i.e. a reduction of the melting point cannot be observed. The crystal structure is not interrupted within the said curves. The three curves are in all ranges above the limit of decomposition which is between about 310 and 320° C. It is possible, however, to melt the products by heating them very rapidly. When they are heated slowly they vaporize at temperatures in the range between the limit of decomposition and the indicated curves of melting points. The abbreviations used stand for the following monomers used for copolymerization:

3,4-DML—3,4-dimethylazetidin-2-one
ML—4-methyl-azetidin-2-one
E1—4-ethyl-azetidin-2-one
JPL—4-isopropyl-azetidin-2-one 4,4-DML—4,4-dimethyl-azetidin-2-one
PL—4-phenyl-azetidin-2-one
MPL—4-methyl-4-n-propyl-azetidin-2-one
NML—4-neopentyl-4-methyl-azetidin-2-one
PY—pyrrolidone-2
BCHL—3,4-[2,3-bicyclo-(2,2-)heptenyl]-azetidin-2-one
BCHLΔ—3,4-[2,3-bicyclo-(2,2,1)heptenylen]-azetidin-2-one
Z—lower limit of decomposition

EXAMPLE 2

In the following table there are indicated the tensile strengths of filaments of copolymers of 4-monomethyl-azetidin-2-one (ML), and 3,4-dimethyl-azetidin-2-one (3,4-DML). The products used had comparable molecular weights and were spun under comparable conditions.

The filaments of the copolymers, whether they were heat-set or not, had distinctly higher tensile strengths than the filaments made from the two homopolymers.

TABLE

| Percent by weight of— | | Tensile strength (g./denier) | |
|---|---|---|---|
| ML | 3,4-DML | Filament without heat setting | Filament with heat setting |
| 100 | —— | 2.4 | 3.1 |
| 90 | 10 | 2.7 | 3.3 |
| 80 | 20 | 3.2 | 3.9 |
| 70 | 30 | 3.4 | 4.0 |
| 60 | 40 | 2.9 | 4.1 |
| 50 | 50 | 2.8 | 3.7 |
| 40 | 60 | 3.3 | 4.4 |
| 30 | 70 | 2.4 | 4.1 |
| 20 | 80 | 2.5 | 3.4 |
| 10 | 90 | 2.4 | 2.7 |
| —— | 100 | 2.3 | 2.6 |

EXAMPLE 3

40 parts of 4-ethyl-azetidin-2-one and 60 parts of 3,4-dimethyl-azetidin-2-one were copolymerized in dimethyl sulfoxide according to known process of the β-lactam polymerization in the presence of an alkaline catalyst. The copolymer obtained melted at 330° C. with decomposition and had a relative viscosity of 7.3, determined with a 1% solution in concentrated sulfuric acid at 20° C. It could be spun from formic acid to mat, soft and flexible filaments which had a tensile strength of 2.51 g./denier.

EXAMPLE 4

40 parts of 4-ethyl-azetidin-2-one and 60 parts of 4-monomethyl-azetidin-2-one were mixed with 100 parts of dimethyl sulfoxide and the mixture was copolymerized in a gasoline dispersion according to a known process of the β-lactam polymerization in the presence of an alkaline catalyst. A copolymer was obtained which melted at 325° C. with decomposition and had a relative viscosity of 6.55, determined in a 1% solution in concentrated sulfuric acid at 20° C. The copolymer could be spun from formic acid to bright, transparent filaments having a tensile strength of 2.87 g./denier.

I claim:
1. Copoly-β-amides suitable for forming fibers, filaments, and the like consisting of the polymeric product of at least two β-lactams selected from the group consisting of 3,4-dimethyl-azetidin-2-one, 4 - monomethyl - azetidin-2-one and 4-monoethyl-azetidin-2-one.
2. Copoly-β-amides suitable for forming fibers, filaments, and the like consisting of the polymeric product of 80–50% by weight of 4-monomethyl-azetidin-2-one, 15–30% by weight of 3,4-dimethyl-azetidin-2-one and 5–20% by weight of 4-monoethyl-azetidin-2-one.
3. Fibers of copoly-β-amides consisting of 80–50% by weight of 4-monomethyl-azetidin-2-one, 15–30% by weight of 3,4 - dimethyl - azetidin - 2 - one and 5–20% by weight of 4-monoethyl-azetidin-2-one.

References Cited

UNITED STATES PATENTS

| 2,333,752 | 11/1943 | Ufer. |
| 2,356,516 | 8/1944 | Hagedorn. |
| 2,500,317 | 3/1950 | Lincoln. |
| 3,093,618 | 6/1963 | Graf et al. |
| 3,211,706 | 10/1965 | Borner. |
| 3,220,983 | 11/1965 | Schmidt. |

OTHER REFERENCES

Edgar et al., Journal of Polymer Science, vol. 8, 1952, pp. 15–19.

WILLIAM H. SHORT, *Primary Examiner.*

F. D. ANDERSON, *Assistant Examiner.*

U.S. Cl. X.R.

260—30.8, 31.2; 264—176